April 3, 1956 J. A. BECKER ET AL 2,740,940

HIGH SPEED NEGATIVE RESISTANCE

Filed Dec. 8, 1950 2 Sheets-Sheet 1

INVENTORS J. A. BECKER
M. C. WALTZ

BY

ATTORNEY

INVENTORS J. A. BECKER
M. C. WALTZ
BY [signature]
ATTORNEY

United States Patent Office 2,740,940

Patented Apr. 3, 1956

2,740,940

HIGH SPEED NEGATIVE RESISTANCE

Joseph A. Becker, Summit, and Maynard C. Waltz, Maplewood, N. J., assignors to Bell Telephone Laboratories, Incorporated, New York, N. Y., a corporation of New York Application December 8, 1950, Serial No. 199,868

9 Claims. (Cl. 333—80)

This invention relates to semiconductive circuit elements and, more particularly, to circuit elements having the characteristic that as the current through them increases, the voltage across them decreases to provide in effect a negative dynamic resistance, to their methods of operation to obtain negative dynamic resistances, and to methods of producing these circuit elements.

Heretofore, negative dynamic resistances have been known in the art; however, such elements have utilized thermal effects for their operation and have been limited in their speed of response to their rate of thermal dissipation. This in turn has required the use of very small masses of material in order to obtain a speed of response even of the order of 1000 cycles per second, and, therefore, the power handling capacity and frequency of operation of these devices have been limited. Further, these units have not been entirely stable electrically nor have they been rugged mechanically.

One object of this invention is to increase the speed of response of negative dynamic resistances.

Another object of this invention is to increase the power handling capacity and the mechanical and electrical stability of high speed negative dynamic resistances.

Another object of this invention is to improve semiconductive materials having declining voltage-current characteristics.

Another object of this invention is to stabilize negative dynamic resistance characteristics against variations due to changes in the load on the circuit in which such devices are employed.

A further object of this invention is to facilitate the production of reproducible, stable, high speed of response negative dynamic resistances.

One feature of this invention resides in operating a semiconductive body with portions thereof divided into three regions, an intrinsic region, an extrinsic region, and an intermediate transition region between these two.

Another feature of this invention resides in operating a semiconductive body of one conductivity type including an intrinsic, an extrinsic, and a transition region so that carriers of the conductivity type opposite those normally present in the extrinsic region are caused to flow into that region from the intrinsic region to form the transition region and then applying a signal to the device to modify the number of carriers present in the transition region so that an increase in current results in a decrease in voltage to provide a negative dynamic resistance.

Another feature of this invention resides in utilizing a semiconductive material having a short lifetime for the injected carriers of the type opposite those normally present in the extrinsic region. This material is formed into a body of such size that the carriers injected from a properly poled intrinsic region into the extrinsic region to form a transition region decay before reaching the limits of the extrinsic region. Fields are then applied to the transition region thus defined to modify the number of carriers present and thus its resistance.

Another feature resides in utilizing as a negative dynamic resistance having a high speed of response a semiconductive body containing a high concentration of significant impurities, thereby limiting the lifetime of injected carriers, and having a metallic contact to one surface in combination with a means of applying a biasing current of such magnitude that power dissipation in the region of the body adjacent the metallic contact is sufficient to heat it to the intrinsic conductivity condition, and applying means to drive charge carriers of the type opposite those normally present in the extrinsic region into that region from the intrinsic material.

A further feature of this invention resides in producing germanium material having substantially symmetrical current versus voltage characteristics and which may be operated on a declining voltage-current characteristic by alloying germanium, antimony, and aluminum.

Another feature of this invention resides in specific means of alloying germanium, antimony, and aluminum, namely, by heat treating antimony-doped germanium in the presence of aluminum oxide or by coating substantially pure germanium with fine particles of antimony and heat treating the body in the presence of aluminum oxide.

Another feature resides in combining as a circuit component having a negative dynamic resistance and a high speed of response a body of P-type germanium material containing antimony and aluminum and having a metal contact on one surface thereof with means for applying a biasing current. The applied bias current is of such magnitude that the power dissipation in the region of the point contact heats the material to a temperature at which intrinsic conductivity occurs, the current bias being such that the point is negative relative to the germanium body whereby electrons are forced from the intrinsic region of the body into the extrinsic region by the resulting field.

Referring now to the drawings, which when read in conjunction with the following detailed description will aid in the further appreciation of the above and other objects and features of this invention:

Figure 1:
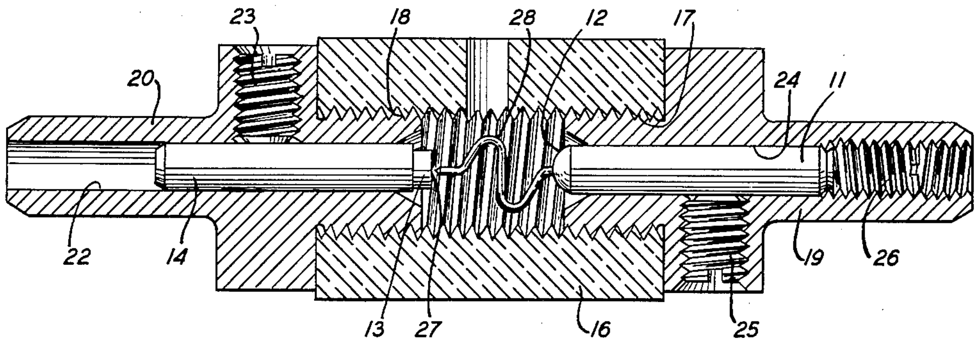
Fig. 1 is a sectioned elevation of a unit having a high speed of response in a region of negative dynamic resistance constructed in accordance with this invention.

At the outset, it will be helpful to discuss some of the basic concepts of semiconductors, as an aid to the appreciation of this invention. Electrical energy flows through semiconductors by two processes, intrinsic and extrinsic conductivity. Intrinsic conductivity can be attributed to the thermal excitation of electrons, negative charge carriers, from the filled energy band across a forbidden region, and into an empty energy band, thereby making positive carriers, holes, in the filled band and electrons in the empty band, both of which are available to contribute to the conductivity of the material. Extrinsic conductivity occurs because of the presence of extra energy levels between the empty and filled band. These extra levels are the result of lattice imperfections or the presence of impurities. These extra levels lying in the forbidden band may act in one of two ways. If the extra level is near the empty band, it is possible for an electron occupying this level to enter the empty band with only a small change in energy. If the extra level is near the filled band, it is possible for an electron to leave the filled band and enter the close lying impurity levels with a small change in energy. In the first case, the level has been said to donate an electron to the empty band, and the impurity causing the level is called a donor impurity. The semiconducting material containing the donor impurity is called a donor type or N-type semiconductor. In the second case, the level has been said to accept an electron, and the impurity is referred to as an acceptor or P-type impurity. Only impurities which give levels in the forbidden band are referred to as "significant impurities."

Both germanium and silicon have a diamond cubic lattice with tetrahedral bonds. A number of materials from the third group of the periodic table when present in the lattice act as significant impurities and as immobile acceptors accepting an electron from the filled band. These materials create an electron deficiency or hole in the lattice and are called acceptor impurities. Electrons may be displaced in the lattice due to this deficiency by, in effect, moving the resulting hole through the material as a positive charge carrier. Similarly, some substances from the fifth periodic group, these having five valence electrons, act as donors by supplying four of their electrons to complete the tetrahedral bond and contributing their fifth electron to the lattice as an unbound negative charge carrier when sufficient energy is applied to the material. The ionized donor impurities then act as an immobile positive ion. Those semiconductors exhibiting extrinsic conductivity by holes or positive charge carriers are identified as P type, while those in which conduction is by negative charge carriers or electrons are identified as N type. Typical donor impurities are phosphorous, arsenic, and antimony, while typical acceptors include boron, aluminum, indium, and gallium.

Broadly, negative resistances according to this invention utilize electrostatic field effects rather than thermal effects in following the declining voltage-current characteristic of the material being employed, and, therefore, they are inherently faster than devices known heretofore. The operation relies on the maintenance of a region within the extrinsic body portion of the semi-conductor which contains charge carriers of both types. This region is created by a field which forces charge carriers of the type not normally present in the extrinsic body into the body. Resistance changes in the over-all device are achieved by effecting a change in the charge carrier content of the region, this in turn being done by modifying the field.

Thus, in a specific embodiment, the region can be established by applying a biasing current through a contact to an extrinsic semiconductor of sufficient magnitude to heat a region under the contact to the temperature at which intrinsic conduction predominates in the material, thus forming a region containing a great number of charge carriers of both types. The bias current can be so poled that charge carriers of the type not normally present in the extrinsic body are repelled by the contact and hence are forced out of the intrinsic region to form the intermediate region in the extrinsic body. Charge carriers in the extrinsic body are attracted by the opposite type charge carriers injected into the intermediate region and are drawn into that region. A signal is then applied to the combination to change the field formed by the poled current, thereby changing the number of carriers in the intermediate region and thus increasing or decreasing the conductivity of that region and of the over-all unit. For example, a P-type body which in the extrinsic state contains holes as charge carriers can be provided with a point contact through which the bias current is applied, the point being negative, to force electrons into the intermediate region. As the field is increased, more electrons are forced into the region and more holes are attracted there from the extrinsic material, and this increase of carriers increases the conductivity or lowers the resistance. Similarly, a decrease in the field decreases the number of electrons and holes present, decreasing the conductivity and increasing the resistance.

According to one theory of operation of the devices constructed in accordance with this invention, an extrinsic material having a short lifetime for injected charge carriers of the type opposite those normally present and a high resistivity, is desirable for high frequency operation. It is important to the operation of the devices that the temperature at which intrinsic conduction predominates is low enough so that a portion of the material can be made predominately intrinsic at a practical temperature, for example, that generated by a biasing current through the device. Charge carrier lifetime is inversely related to the absolute amount of significant impurity present in the semiconductor; thus, a short lifetime requires a high absolute concentration of significant impurity. Resistivity of extrinsic semiconductors depends upon the number of free charge carriers created by the extra levels discussed above, and this in turn can be controlled by the predominance of material creating these extra levels, since opposite type impurities tend to cancel each other, the hole created by an acceptor being filled by the extra electron of a donor. Thus, high resistivity can be obtained even with a high absolute quantity of significant impurity by permitting only a slight excess of one type charge carrier to be present. The temperature at which intrinsic conductivity predominates is increased by an increase in the unbalance of impurity; thus, where more effective carriers are present in the uncombined state, the temperature is higher. It is, therefore, also desirable from the standpoint of convenience in operating a portion of the material intrinsic to maintain a near balance of acceptor and donor significant impurities in the semiconductor. The above effects can be attained by employing material containing from 0.1 to 8 or 10 atomic per cent of significant impurities proportioned so that the acceptors and donors are in near balance.

In semiconductive elements as generally employed in rectifiers and detectors, the significant impurity concentration has been kept at low levels, of the order of a few ten thousandths of one per cent. Further, the significant impurities present are so proportioned that a good rectifier results. The semiconductive bodies of early crystal detector devices employing the cat-whisker type of limited area contact, although of lower purity than material employed today, were also chosen for their good rectifying qualities. The material employed for the devices disclosed here is such as exhibits substantially no rectification, since it has a relatively high absolute significant impurity content and a near balance of acceptor and donor impurities.

Figure 2:
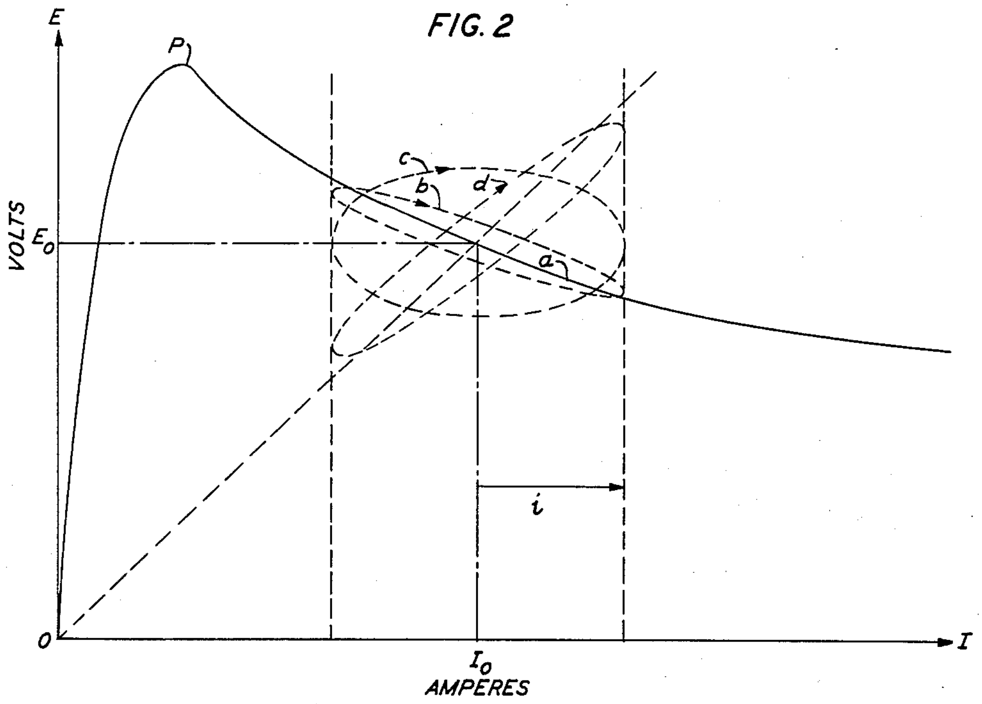
Fig. 2 is a plot of voltage against current for a unit of the type shown in Fig. 1 illustrating a dynamic characteristic of such a device at various frequencies.

A typical plot of voltage against current for a substantially non-rectifying semiconductor circuit element of the type employed in the present invention comprising an ohmic contact and a metal contact to a semiconductive body is disclosed in Fig. 2. This curve is obtained by varying the current through the element and measuring the voltage drop across it. It is observed that at low currents, the voltage increases with the current and that the curve has a rather steep slope. Since ambient temperature is about 30 degrees centigrade and the power dissipation in the region under the contact is relatively low at these currents, the temperature of the entire semiconductor body is below the temperature at which intrinsic conduction predominates, and the entire body is operated as an extrinsic semiconductor. The curve begins to decrease its slope as the current is increased, then reaches a maximum at the peak P beyond which further increases in current cause a voltage drop. This effect can be attributed to the heating of a portion of the body in the region of the contact to above the temperature at which intrinsic conductivity predominates due to power dissipation. Thus, that material begins to become intrinsic and therefore the charge carriers in that region are greatly increased, thereby increasing the conductivity of the material. As the power dissipation increases, the material immediately under the contact becomes completely intrinsic and that adjacent partially so; thus, the number of charge carriers and, therefore, the conductivity increases to such an extent that the voltage drop across the device declines. Considering a specific instance where the semiconductive body is of P-type material, conductivity at low current occurs principally by holes and, as the material becomes intrinsic, by holes and electrons with holes in a small majority.

Considering the dynamic characteristics, if a direct ($I_0$) is applied to a unit having a characteristic as shown in Fig. 2 and an alternating current having a maximum ($i$) is superimposed: At low frequencies, the voltage and current follow the solid line curve ($a$); at higher frequencies, the voltage and current follow the ellipse ($b$) whose major axis is nearly along the curve ($a$); at increasing frequencies, the voltage and current will follow the curves ($c$) and ($d$). The frequency at which the E–I pattern is an ellipse having a horizontal major axis is called the critical frequency. Below the critical frequency, the unit exhibits an effective alternating-current resistance which is negative. Above the critical frequency, it is positive ($d$), and at infinite frequencies, the ellipse will close completely to give a line having a slope which is equal to the direct-current resistance of the unit. The higher the critical frequency is, the faster the unit is said to be.

The critical frequency of the devices varies as the bias current is changed. As the bias current is increased beyond the peak (P), the critical frequency increases from zero and reaches a maximum when the value of $$\frac{d(\log E)}{d(\log I)}$$

has its greatest negative value. Above this bias current, the critical frequency decreases again when $$\frac{d(\log E)}{d(\log I)}$$

approaches zero.

Figure 3:
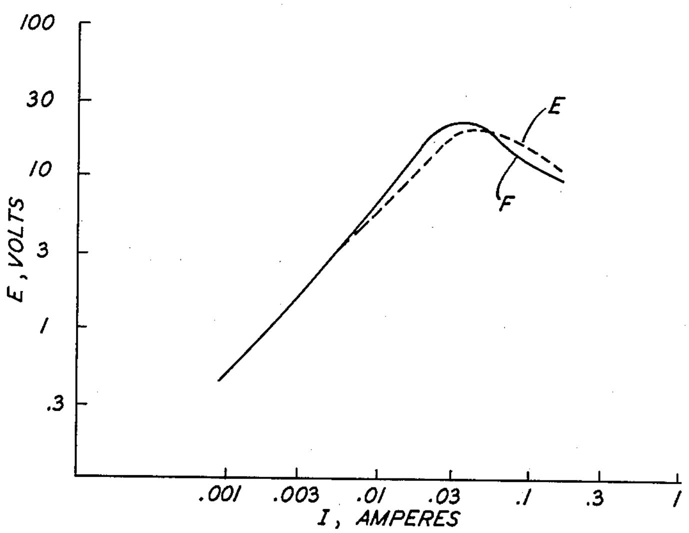
Fig. 3 is a plot of the logarithm of voltage against the logarithm of current for a unit of the type shown in Fig. 1, showing the shape of the characteristic for the unit with the restricted area contact biased positive and negative.

The critical frequency obtained for units having semiconductive bodies which can be biased into the intrinsic region in the area of the contact depends upon the polarity of the bias current as well as its magnitude. Units having germanium bodies which are of relatively high resistivity, short injected charge carrier lifetime, P-type material produced by the addition of the significant impurities aluminum and antimony, as set forth hereinafter, have exhibited critical frequencies at least in the kilocycle range, of the order of 100 kilocycles per second, when the point contact was made negative with respect to the germanium wafer, while similar units with the point biased positive have a maximum critical frequency of the order of 20 cycles per second. The frequency at which the unit will oscillate increases when the contact pressure on the metallic contact is decreased so that even with a positively biased point, the unit will operate up to 1000 cycles per second; however, this causes a reduction in the peak of the E–I curve, and thus the power handling capacity of the device and a sacrifice in the mechanical stability also occurs. It is worthy of note in regard to the germanium-aluminum-antimony unit that although a relatively large difference exists between the maximum critical frequencies at the different point polarities, the direct-current curves, as illustrated in Fig. 3, are similar in shape and of about the same value. Curve E representing the plot for a unit with the point positive and curve F being a plot for the point negative.

Units having an E–I plot of the sort portrayed in Fig. 2 and having the contact biased to repel the carriers normally present in the extrinsic body portion have their dynamic characteristics determined by temperature variations produced by power dissipation in the region of the contact and their frequencies limited by the thermal inertia of this region. However, when these units have their contacts biased to repel carriers of the type not normally present in the extrinsic body portion, i. e., biased in the reverse direction for an ordinary rectifier of this conductivity type, their dynamic characteristics are determined by a combination of temperature variations produced by power dissipation and the injection of carriers of the opposite sign into the extrinsic region. Thus, if the exemplary construction for dynamic characteristics shown in Fig. 2 were applied to the particular material from which the curves of Fig. 3 were obtained, a P-type germanium body, a characteristic for a positively biased contact would operate around curve E, and a characteristic for a negatively biased contact would operate around curve F with a much higher critical frequency.

Investigations of a germanium-aluminum-antimony body 50 mils square and 20 mils thick soldered to a brass pin 50 mils in diameter and engaged by a pointed 5-mill tungsten wire to form a contact having a diameter of 0.5-mil diameter or $1.3 \times 10^{-4}$ square millimeters showed that the critical frequency was approximately 20 cycles per second when the point was biased positive relative to the P-type germanium body. On the other hand, when these units were biased with their points negative relative to the P-type body, their critical frequency was increased to 80,000 cycles per second or higher due to the injection of electrons into the extrinsic region from the intrinsic region. This injection effect will also occur with larger area contacts.

Figure 4:
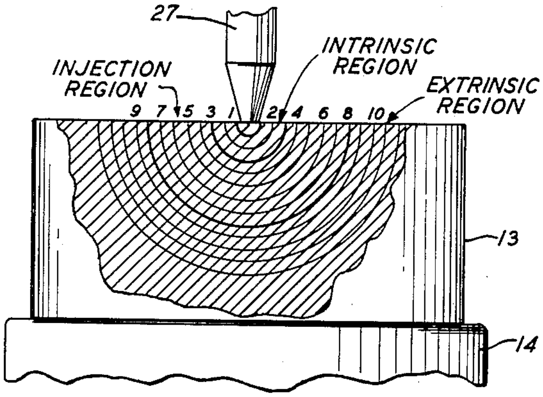
Fig. 4 is a diagrammatic representation of a cross section of semiconductor taken at the center of the contact constructed and operated according to this invention, equipotential hemispheres and the boundaries of the various regions being shown.

The injection effect can be appreciated by considering Fig. 4 showing a series of equipotential surfaces which are in the form of concentric hemispheres with their centers at the center of the contact area so that the entire volume of the body is divided into spherical shells all having the same thickness $\Delta r$. The resistance of any shell of radius $r$ and specific resistivity $\rho$ equals $$\frac{\rho \Delta r}{2\pi r^2}$$

Hence, for small currents, most of the resistance is concentrated in the shell near the point contact, and it follows that most of the power is dissipated here, and the rise of temperature above ambient is greatest here and falls off rapidly with $r$. As the current is increased, the temperature of the shells 1, 2, and 3, for example, very near the point contact increases. It is known that for extrinsic germanium, this results in a decrease in mobility and hence an increase in resistance. Hence, the resistance increases with increasing I as shown in Fig. 3 for I up to about .025 ampere. When this temperature becomes high enough so that the first shell 1 becomes intrinsic, a new phenomenon occurs. Then, large numbers of both electron and hole carriers are generated in the first shell. This greatly decreases the resistance of this shell; and since most of the total resistance is in this shell, the total resistance decreases. As the current increases from .025 to .10 ampere, a few more shells become intrinsic and decrease in resistance. Hence, the total resistance decreases rapidly with I so that as I increases, E decreases.

If the point has a negative potential and the current is beyond the peak, still another effect is produced, namely, the injection effect. The electrical field is now such that the electrons in the intrinsic shells are injected into neighboring shells 4, 5, 6, and 7, which are extrinsic. The distance to which these electrons are injected depends on the product of the mobility, the field, and the mean lifetime $\tau$. This lifetime is the mean time that an electron remains in the conduction band. The life of an electron may be terminated by combining with a hole or with a positively ionized donor. For germanium containing high concentrations of both donors and acceptors, $\tau$ is about $10^{-6}$ seconds, the mobility may be about 33 centimeters per second per volt per centimeter, and the fields may be about 300 volts per centimeter. For such a case, the injection distances would be $10^{-6}\times33\times300=10^{-2}$ centimeters. There are thus three regions to consider: an intrinsic region of a few shells 1, 2, and 3 near the point contact, an injection region 4, 5, 6, and 7 farther away, and a third or normal extrinsic region, shells 8 and beyond, extending to the base contact; these are shown in Fig. 4. The electrons which are injected into the injection region will attract an equal number of holes from the normal extrinsic region so as to maintain electrical neutrality. As a result, the injection region contains not only the holes normally present in an extrinsic region but an additional number of electrons and holes. This decreases the resistance in this region by appreciable amounts. Since the resistance of this region comprises a fairly large fraction of the total resistance, the total resistance is reduced appreciably as a result of the injection effect. This explains why the resistance for curve F in Fig. 3 decreases more rapidly than that for curve E for which there is no similar injection effect. For curve E, the polarity is such that holes are injected from the intrinsic shells into the injection region, but these holes cannot attract electrons from the normal extrinsic region since no electron carriers exist in this region, the material being P type extrinsic. The injected holes merely repel the holes that already exist in the injection region and drive them into the third region and thence into the base contact. Hence, the injection region is not reduced in resistance.

Consider what happens when the current which has been steady at say .10 ampere is suddenly increased to .11 ampere or by 10 per cent. At the instant this is done, the field in every shell and hence also the total voltage will increase by 10 per cent. In the electron lifetime, $\tau$ electrons can travel a distance 10 per cent greater than before. As a result, the radius of the injection region is enlarged 10 per cent, and more electrons will enter the injection region from the intrinsic region. Hence, the resistance of the injection region and of the first few shells of the original third region will decrease. Hence, the total voltage will decrease and reach a new steady state value below its value for $I=.10$. This new steady state will be approached asymptotically. It will reach substantially its final value in a time about $10\tau$. If $\tau=10^{-6}$ sec., the time required to come within a few per cent of the final steady value will be $10\tau$ or $10^{-5}$ seconds. If after this time the current is reduced to .10 ampere, the field in each shell will be reduced 10 per cent; the injection distance will be reduced; the number of electrons injected into the injection region will be reduced; the resistance of the injection region will rise and with it the total voltage across the unit. The final steady state will again be that which originally prevailed for $I=.10$ ampere. Again, the final steady state will be approached asymptotically and will be substantially constant in $10^{-5}$ seconds.

The device will thus operate as a negative resistance for frequencies less than about 100,000 cycles per second but will act like a positive resistance for frequencies about ten times greater than this. These values of critical frequencies are dependent on the value of $\tau$, the mean life of an injected charge carrier, in the case of P-type material an electron, in the conduction band. For pure germanium or germanium containing small fractions of 1 per cent of impurity atoms, the lifetime $\tau$ is the order of $10^{-3}$ seconds, or 1000 microseconds. Such materials would have critical frequencies of the order of 1000 cycles per second when operated with a polarity producing an injection region. By introducing impurities of a concentration of the order of 1 atomic per cent or of $4\times10^{20}$ impurity atoms per $cm.^3$, the time constant is greatly reduced, since the lifetime $\tau$ is reduced to about 1 microsecond. This seems to be especially pronounced if both donor and acceptor impurities are added.

While the above discussion has dealt with the injection of electrons into P-type intrinsic material containing an excess of acceptor impurities over donor impurities, it is equally applicable to the injection of holes into N-type material containing an excess of donors to acceptors.

Considering now a specific embodiment of a semiconductor unit which can be operated in the manner suggested above, Fig. 1 shows one suitable construction comprising three basic elements, the housing, the contact assembly, and a semiconductor assembly. The contact assembly includes a pin 11 having an axial hole in one end in which is secured a contact wire 12 which may be of gold-plated 5-mil tungsten wire pointed by grinding or etching after mounting. A wafer of some suitable semiconductor, for example, germanium, prepared by one of the methods set forth hereinafter, is mounted on the brass pin 14 with an ohmic connection thereto to form the semiconductor assembly. The housing consists of a ceramic tube 16 threaded internally to receive the threaded ends 17 and 18 of the end members 19 and 20 holding the contact assembly and semiconductor assembly, respectively. The unit is assembled by sliding pin 14 into the axial bore 22 in end 20 and fixing it therein by tightening the set screw 23. Next, the contact assembly is mounted by sliding the pin 11 into the bore 24, tightening set screw 25, and advancing the pin by means of lead screw 26 until the pointed tip 27 of wire 12 contacts the surface of wafer 13, as indicated by electrical measurement. The screw 26 (which had 80 threads per inch in the units employed in obtaining the data set forth in this specification) is then given another quarter turn, thus deflecting the spring 28 by about 3 mils to mechanically stabilize the point on the semiconductor surface and to increase the area of contact.

Germanium material suitable for use in these units may be obtained by reducing the germanium dioxide in a hydrogen atmosphere, as set forth in the application of J. H. Scaff and H. C. Thuerer, Serial No. 638,351, filed December 29, 1945, now Patent 2,602,211 which issued July 8, 1952. This material can be alloyed with antimony by fusion or the substantially pure ingot resulting from the reduction can be cut into wafers of the desired size and the antimony applied to the surface thereof from a colloidal suspension and made to alloy with the body by heat treatment.

The alloying by fusion to produce successful elements may be effected by first adding about 0.0003 per cent by weight of antimony to the substantially pure germanium, both preferably being in powdered form. This mixture is then fused in a graphite crucible by heating it in an atmosphere of helium to a temperature of about 1200° C. After the contents of the crucible are completely liquefied, it may be progressively cooled along an axis of the ingot. This may be done in the manner set forth in the above Scaff-Thuerer patent application wherein an induction furnace is employed having a coil which can be moved relative to the crucible by raising the coil slowly while maintaining the power therein. This progressive cooling results in a non-uniform composition throughout the ingot which, however, follows a regular pattern of an increasing ratio of antimony to germanium from the bottom to the top of the ingot. The second method of alloying germanium with antimony which proves most successful from the standpoint of yield and uniformity of product is applied to wafers which are cut or otherwise mechanically separated from the substantially pure germanium. These bodies are cleaned by washing in nitric acid. They are then washed in distilled water and dried on filter paper. The antimony is then added by dipping the bodies into a suspension of antimony and distilled water and placing them, still wet, in the furnace used for heat treating. The suspension of antimony may be made by grinding in a clean mortar and pestle for about fifteen minutes 2 grams of antimony and 5 millileters of water with two drops of glycerine. The cloudy liquid is decanted after allowing it to settle for about 30 seconds and is then ready to apply to the germanium.

The germanium-antimony alloy prepared by either method is heat treated to make the material substantially non-rectifying when probed with a tungsten point. This is done by heat treating at a temperature from 600° C. to 650° C. in contact with aluminum oxide ($Al_2O_3$) in a vacuum of the order of $10^{-5}$ millimeters of mercury, thereby adding aluminum to the alloy. The probable result of this treatment is a reaction of the aluminum oxide with the germanium alloy to create both donor impurities antimony and acceptor impurities aluminum with the latter predominating.

The heat treatment in the case of the germanium in which the antimony was added before fusion will vary depending on the position of the slice in the ingot because of the varying composition referred to above. Slices from the middle and bottom of the ingot having the lower antimony content will not require as high a temperature or as long a heating time as material from near the top. Successful units having a declining voltage-current characteristic can be made by heating this material for two hours in an aluminum oxide boat at a temperature of about 600° C. in a vacuum and then cooling it at a relatively fast rate, initially about 4° C. per second in the furnace which was employed.

In the case where the antimony is added from suspension before heat treating, the position of the slice in the original ingot does not appear to be of great moment. Slices from near the top and near the bottom of the melt behave similarly and give similar units. These suspension-coated bodies are heat treated in an aluminum oxide boat for about two hours at 650° C. in a vacuum and cooled rapidly. The heat treatments may be effected in a furnace comprising a tube about ¼ inch in diameter and about ¾ inch long constructed by forming a coil of 50-mil tungsten wire wound in a ¼-inch diameter with about 25 mils between adjacent turns, covering the coil and one end thereof with a mixture of aluminum oxide and water, and firing the assembly in a vacuum at about 1800° C. in order to sinter it. The completed furnace is operated under a bell jar which can be evacuated to about $10^{-5}$ millimeters of mercury. Temperature of the elements being treated may be observed by employing a suitable thermo-couple as close to the element as possible; this may be done, for example, by using a thermo-couple, the leads of which pass through the end wall of the furnace. The cooling rate of this furnace is about 4° C. per second when the power is first shut off and the furnace cools to half temperature, i. e., the temperature half way between room temperature and the initial furnace temperature in about 90 seconds.

A surface of the wafer is next prepared to enable a good electrical and mechanical connection to be made to the pin 14; for example, this may be done by applying a copper plating. The surface on which the point contact is mounted is etched to remove the portion of the crystal lattice which has been disrupted in the mechanical separating operation, thereby giving the unit the proper electrical properties. These surface treatments may be conveniently effected in several ways. One method is to first copper plate one side of the wafer, solder the wafer to the pin of the assembly, and then etch the upper surface of the wafer. The etching may be done in a mixture of two parts concentrated nitric acid, two parts of 2 per cent solution of copper nitrate, and one part of concentrated hydrofluoric acid or in the etches such as those disclosed in the application of H. C. Thuerer, Serial No. 135,817, filed December 29, 1949, now Patent 2,542,727 which issued February 20, 1951, comprising forty parts of water, ten parts of 48 per cent hydrofluoric acid, and ten parts of 30 per cent hydrogen peroxide, or that disclosed in the application of R. D. Heidenreich, Serial No. 164,303, filed May 25, 1950, now Patent 2,619,414, which issued November 25, 1952, comprising fifteen parts of acetic acid, 25 parts of nitric acid, (1.42 specific gravity), fifteen parts of 48 per cent hydrofluoric acid, and one part of liquid bromine. These solutions, which should be made up of elements of chemical purity, may have a detrimental effect on the pin as well as the solder holding the wafer on the pin. Hence, it is advisable to keep the solution from coming in contact with these portions during the etching. The etching is allowed to proceed until the germanium surface has a miror finish; at room temperature this occurs in from 15 seconds to 2 minutes, and they are then washed in distilled water or methyl alcohol and dried.

Another method of surface treatment which gives satisfactory results is as follows. The wafers after the heat treatment are placed in the etching solution and etched over their entire surface. They are next washed in distilled water and are copper plated completely. This copper plating serves as a surface to which solder adheres in mounting the unit on the pin 18 and also protects the etched surface from the air, moisture, and other possible contaminants. After the wafers are soldered onto the pins, the whole assembly is dipped in dilute nitric acid which dissolves the exposed copper plating on the germanium.

Following the assembly, as set forth in the above discussion of the structure shown in Fig. 1, the unit is subjected to an electrical forming and stabilizing process wherein it is connected to a variable voltage which may be adjusted from zero to 500 volts, in series with a limiting resistance of the order of 1000 ohms. The germanium is made positive and 0.5 ampere allowed to flow through it for about a second after which the unit is ready for use.

While the results obtained with a device of the above construction employing aluminum and antimony as doping agents have been excellent, it is to be understood that the desired characteristics, namely, a substantially symmetrical direct-current characteristic, stability, high resistivity, short injected charge carrier lifetimes, and a material which is extrinsic at room temperatures and which becomes intrinsic at elevated temperatures, can be obtained by adding at least 0.1 per cent by weight of significant impurities in near balance with either acceptors or donors in excess.

The P-type non-rectifying germanium-aluminum-antimony body in the device of Fig. 1 is 50 mils square and 20 mils thick and is soldered to a brass pin 14, 50 mils in diameter. It can carry 0.5 ampere at 4 volts without damage and, therefore, relatively speaking is a high power device. However, in view of this mass, the critical frequency when thermal effects alone are the determining factor, when the contact is positive relative to the body, is between 20 and 1000 cycles depending upon the contact pressure. When the device is operated with the contact negative relative to the body and with a bias current sufficient to raise the temperature in the region of the contact above the temperature at which intrinsic semiconduction predominates so that the field forces electrons out of the intrinsic portion into those portions which are P-type extrinsic material, the device has exhibited a critical frequency of the order of 100 kilocycles. It has a theoretical critical frequency above this when operated in this manner.

Figure 5:
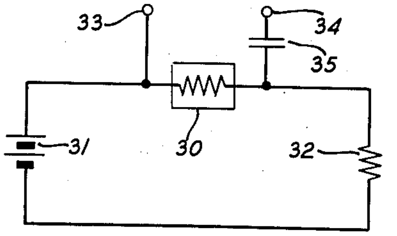
Fig. 5 shows a high speed switching circuit embodying this invention.

Referring now to a specific application of this type device, Fig. 5 shows a high speed switching circuit employing one of the P-type units of Fig. 1. The unit 30 is biased with a voltage and current to the left of the peak P on the curve of Fig. 2 by a battery 31 connected across the unit and the load 32 with the point 27 negative relative to the semiconductive body for high speed switching. While the voltage across the unit is below the peak, the resistance of the unit is high, and the load receives very little power. The application of an aiding signal pulse to the terminals 33 and 34 will carry the voltage of the unit over the peak P, its resistance will drop off rapidly, and the load effectively is switched into the circuit. The condenser 35 isolates the switching circuit from external direct-current sources. The circuit may be switched off by applying a pulse of the opposite polarity, thereby returning the unit to its original condition.

Figure 6:
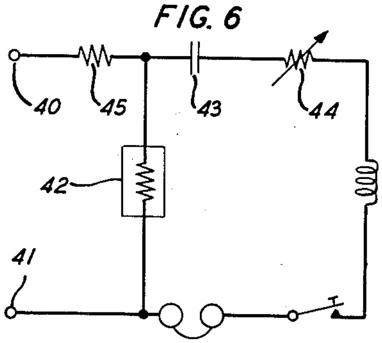
Fig. 6 depicts a negative resistance oscillator circuit employing this invention.

A relaxation oscillator employing a unit of this type is shown in Fig. 6. The operation of the circuit is as follows. A voltage of either polarity, since this device relies on thermal effects in operation, is applied to the terminals 40 and 41, the condenser 43 starts to charge to the applied voltage through the series resistance 44. The unit 42 is cold so it is a high resistance that draws little current. The voltage on the condenser rises until it reaches the peak voltage of the unit, at which time the unit heats, and its resistance drops very rapidly and so discharges the condenser. The series resistance 45 is sufficient to keep the current flowing from the source through the unit low enough so that it cools after the condenser is discharged. Its resistance, therefore, again gets high, and the cycle repeats.

Other circuits in which dynamic negative resistance units according to this invention can be used to advantage in increasing their power handling capacity and their maximum frequency include those modulators shown in Figs. 5, 7, and 8 of L. W. Hussey Patent 2,294,908, issued September 8, 1942. In those circuits, the improvement in characteristics can be obtained by substituting units of this invention for the thermistors employed and applying the biasing current to the units so that charge carriers of the type other than those normally present in the extrinsic body portions thereof are forced into those portions from the intrinsic region.

It is to be understood that the above-described arrangements are illustrative of the application of the principles of the invention and that it is not limited to the structure, material, or methods of treatment disclosed. Particularly, this invention is applicable to semiconductor materials other than germanium, for example, silicon and tellurium. Numerous other arrangements may be devised by those skilled in the art without departing from the spirit and scope of the invention.

What is claimed is:

1. A circuit combination having a declining voltage-current characteristic at frequencies at least in the kilocycle range comprising a body of normally extrinsic semiconductive material of one conductivity type containing at least 0.1 atomic per cent total of acceptor and donor significant impurities, a first contact to said body, an ohmic contact to said body, means for causing a portion of said body engaged by said first contact to exhibit intrinsic conductivity during the operation of said combination, means connected to said first contact for forcing current carriers of the type opposite those normally present in the extrinsic portion of the semiconductor into that portion from the intrinsic region and means connected to said first and ohmic contacts for applying signals to said body at frequencies in the kilocycle range.

2. A circuit combination having a declining voltage-current characteristic at frequencies at least in the kilocycle range comprising a body of normally extrinsic semiconductive material containing at least 0.1 atomic per cent total of acceptor and donor impurities, a restricted area metallic contact to one surface of said body, an ohmic contact to said body, means for maintaining a biasing current through said restricted area contact sufficient to raise the temperature of the body region engaged by said contact to the temperature at which intrinsic semiconduction occurs during the operation of said combination, said biasing current being poled to force carriers of the type opposite those normally present in the extrinsic portion of the semiconductor into that portion from the intrinsic region adjacent said contact, and means connected to said contacts for applying a signal across said restricted area metallic and said ohmic contacts, thereby altering the number of charge carriers of the type opposite those normally present in the extrinsic semiconductor which are forced into the extrinsic region from the region of intrinsic semiconduction.

3. A conductive combination having a negative dynamic resistance at frequencies at least in the kilocycle range comprising a normally extrinsic germanium body of one conductivity type containing at least 0.1 atomic per cent total of aluminum and antimony, a limited area metallic contact to one surface of said body, a large area ohmic contact to said body, means connected to said body for maintaining a biasing current through said limited area metallic contact sufficient to raise the temperature of the body region engaged by said contact to the temperature at which intrinsic semiconduction occurs during the operation of said combination, said biasing current being poled to force the charge carriers of the type opposite those normally present in the extrinsic semiconductor from the region adjacent said limited area contact into the extrinsic semiconductor, and means connected across said metallic and said ohmic contacts for applying a signal to said body, thereby altering the number of charge carriers of the type opposite those normally present in the extrinsic semiconductor which are forced into that region from the intrinsic region adjacent the limited area contact.

4. A conductive combination having a negative dynamic resistance at frequencies at least in the kilocycle range comprising a normally extrinsic germanium body of one conductivity type of at least 0.1 atomic per cent total of acceptor and donor significant impurities in a near balance, a limited area contact to one surface of the body, a large area ohmic contact to said body, means connected to said body for maintaining a biasing current through said limited area contact sufficient to raise the temperature of the body region engaged by said contact to the temperature at which intrinsic semiconduction occurs during the operation of said combination, said current being poled to force charge carriers of the type opposite those normally present in the extrinsic semiconductor from the region heated to intrinsic semiconduction into the extrinsic region, and means connected to said contacts for applying a signal between said limited area contact and said ohmic contact, thereby altering the number of charge carriers of the type opposite those normally present in the extrinsic semiconductor which are forced into that region from the region of intrinsic semiconduction.

5. A signal translating combination exhibiting a dynamic negative resistance at frequencies in the kilocycle range comprising a body of germanium containing at least 0.1 atomic per cent of donor and acceptor impurities in near balance, an ohmic connection to said body, a restricted area, electrically asymmetrical connection to said body, and means biasing said restricted area connection in the forward direction at a current sufficient to maintain the temperature of a region of said body engaged thereby of the order of 200° C. during the operation of said combination.

6. A signal translating combination exhibiting a dynamic negative resistance at frequencies in the kilocycle range comprising a body of germanium containing at least 0.1 atomic per cent of donor and acceptor impurities in near balance, an ohmic connection to said body, a restricted area, electrically asymmetrical connection to said body, and means biasing said restricted area connection in the forward direction at a current of the order of 0.1 ampere during the operation of said combination.

7. A signal translating combination exhibiting a dynamic negative resistance at frequencies in the kilocycle range comprising a body of germanium containing at least 0.1 atomic per cent of antimony and aluminum in near balance, an ohmic connection to said body, a restricted area, electrically asymmetrical connection to said body, and means biasing said restricted area connection in the forward direction at a current sufficient to maintain the temperature of a region of said body engaged thereby of the order of 200° C. during the operation of said combination.

8. A signal translating combination exhibiting a dynamic negative resistance at frequencies in the kilocycle range comprising a body of P-type germanium containing at least 0.1 atomic per cent of antimony and aluminum in near balance, an ohmic connection to said body, a restricted area, electrically asymmetrical connection to said body, and means biasing said restricted area connection negative relative to said body at a current sufficient to maintain the temperature of a region of said body engaged thereby of the order of 200° C. during the operation of said combination.

9. A signal translating combination exhibiting a dynamic negative resistance at frequencies in the kilocycle range comprising an extrinsic semiconductor body containing at least 0.1 atomic per cent of donor and acceptor impurities in near balance, an ohmic connection to said body, a second, electrically asymmetrical connection to said body, and means biasing said second connection in the forward direction at a current sufficient to maintain the temperature of a region of said body engaged thereby at the temperature at which intrinsic conduction predominates in the material of said body during the operation of said combination.

References Cited in the file of this patent

UNITED STATES PATENTS

| | | |
|---|---|---|
| 2,410,076 | Johnson | Oct. 29, 1946 |
| 2,469,569 | Ohl | May 10, 1949 |
| 2,505,633 | Whaley | Apr. 25, 1950 |
| 2,522,521 | Kock | Sept. 19, 1950 |
| 2,544,211 | Barton | Mar. 6, 1951 |
| 2,560,594 | Pearson | July 17, 1951 |

OTHER REFERENCES

Physical Review, vol. 74; 2nd series, Aug. 15, 1948, p. 976. (Copy in Scientific Library.)